Jan. 31, 1961 K. A. KLINGLER 2,969,809
FLUID CONTROL NOZZLE
Filed Sept. 27, 1956

Inventor
Karl A. Klingler
by Parker & Carter
Attorneys

United States Patent Office 2,969,809
Patented Jan. 31, 1961

2,969,809

FLUID CONTROL NOZZLE

Karl A. Klingler, 111 S. Wright St., Naperville, Ill.

Filed Sept. 27, 1956, Ser. No. 612,401

2 Claims. (Cl. 137—625.3)

My invention relates to improvements for hose nozzle and has for one object to provide a combined nozzle and valve which may be screwed onto the end of any suitable hose, for example an air hose, and whereby the valve may be used both to stop and start flow and also to meter flow.

Another object of my invention is to provide a light, durable nozzle with a minimum of projecting parts wherein accurate metering may be accomplished without leakage and without complicated manipulation.

Other objects will appear from time to time throughout the specification and claims.

My invention is illustrated more or less diagrammatically in the accompanying drawings, wherein—

Figure 1:
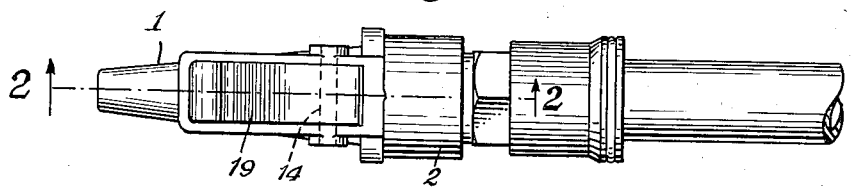
Figure 2:
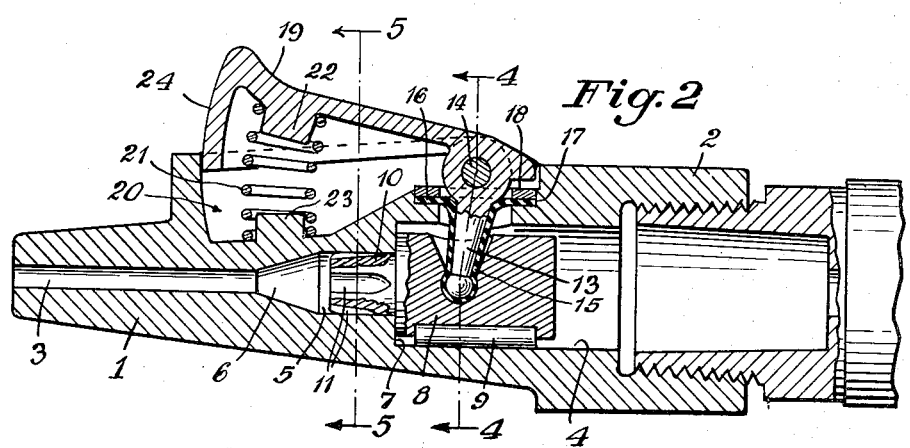
Figure 3:
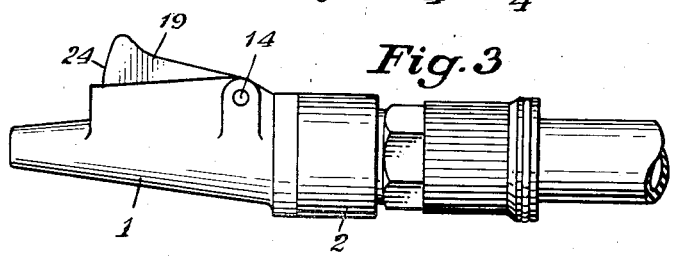
Figure 4:
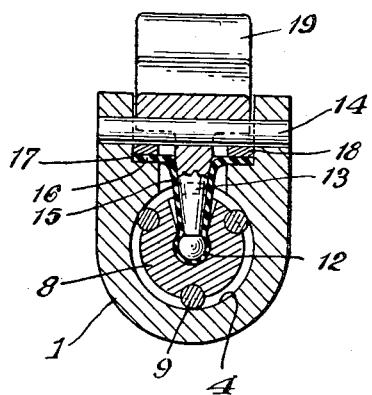
Figure 5:
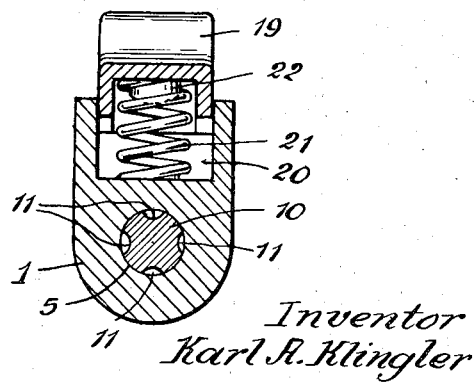

Figure 1 is a plan view of the nozzle;
Figure 2 is a section along the line 2—2 of Figure 1;
Figure 3 is a side elevation of the nozzle;
Figure 4 is a section along the line 4—4 of Figure 2;
Figure 5 is a section along the line 5—5 of Figure 2.

Like parts are indicated by like characters throughout the specification and drawings.

1 indicates the nozzle body tapered forwardly from an enlarged interiorly threaded sleeve 2 which may be threaded onto any suitable fitting. 3 is the discharge duct in the nozzle. The nozzle includes a cylindrical valve chamber 4, a cylindrical metering chamber 5, and a tapered throat 6 leading from the metering chamber to the discharge duct 3. The diameter of the valve chamber 4 is substantially greater than the diameter of the metering chamber 5 and between them is a valve seat 7 encircling the metering chamber and at right angles to the axis of the nozzle.

8 is a cylindrical valve member mounted for reciprocation in the valve chamber. Its outer diameter is greater than the diameter of the metering chamber but less than the diameter of the valve chamber. Guide rods or ribs 9 are let into the outer periphery of the valve member 8, project therefrom and guide and support the valve member in the valve chamber with clearance around the valve member between its outer periphery and the inner wall of the valve chamber.

In the position shown in Figure 2, the valve member is seated on the valve seat 7 and the valve is closed. 10 indicates a metering element extending forwardly from and carried by the valve member. The outer diameter of the metering member is substantially the same as the inner diameter of the metering chamber so when the valve is closed, the metering member is socketed within the metering chamber and is to all intents and purposes negative.

Located in the outer periphery of the metering member are a plurality of tapered longitudinal metering grooves 11. All these metering grooves terminate at and are open to the discharge end of the metering member but their rearward extension toward the valve member varies so that when the valve member is moved to the rear and leaves the seat, first one and then two and then more of the metering grooves are exposed. The depth of the metering grooves decreases from the forward end toward the valve so that as successive metering grooves are open by being brought back behind the valve seat 7, increased discharge away through these grooves becomes available until when the valve member is moved to its further rearmost excursion, the metering members are withdrawn far enough back behind the valve seat 7 that complete flow is permitted.

A pocket 12 is disposed in one side of the valve member 8. A valve actuating finger 13 supported on a pivot 14 carries an elastomeric sack 15 closed at its inner end and enclosing the finger and so socketed with.n the pocket in the valve between the valve body and the finger. This elastomeric sack is flanged as at 16, the flange lying in a groove 17 encircling the opening through which the finger penetrates. 18 indicates a washer resting on the outer edge of the flange and held thereagainst by the pivot 14 to make a tight joint around the aperture through which the valve actuating finger enters the valve chamber. 19 is a valve actuating lever rotating about the pivot 14 with the finger. This lever moves in and out of a lever pocket 20. A spring 21 within the pocket guided by bosses 22, 23 tends to urge the valve to closed position. An extension 24 together with the side walls of the lever closes the pocket so that the spring and lever are all enclosed within the body of the nozzle. The operator holds the nozzle in his hand, exerts pressure on the lever compressing the spring and moving the valve member rearwardly to progressively unseat the valve and permit a metered flow of fluid from the valve chamber through the metering chamber to the discharge duct.

I claim:

1. A fluid control nozzle, comprising a generally cylindrical housing, containing in concentric alignment in the order named, a cylindrical valve chamber, a cylindrical metering chamber of lesser diameter, a conical throat, the cross sectional area of which decreases from the metering chamber to a discharge duct, the diameter of the duct equaling the smallest diameter of the throat, the end wall of the valve chamber forming a valve seat encircling the metering chamber, a valve body in the valve chamber and means for centering in and holding it out of contact with the cylindrical wall of the chamber, the end of the body forming a valve face adapted to seat on the valve seat, a metering cylinder carried by the valve body adapted to penetrate the metering chamber and having longitudinal metering slots cut into the surface of the metering cylinder adapted to be masked by the wall of the metering chamber at different positions of the valve, the housing being apertured at one side of the valve chamber, a lever pivoted on the housing adapted to mask the aperture, a valve actuating finger carried by the lever penetrating the aperture and engaging the valve block.

2. A fluid control nozzle, comprising a generally cylindrical housing, containing in concentric alignment in the order named, a cylindrical valve chamber, a cylindrical metering chamber of lesser diameter, a conical throat, the cross sectional area of which decreases from the metering chamber to a discharge duct, the diameter of the duct equaling the smallest diameter of the throat, the end wall of the valve chamber forming a valve seat encircling the metering chamber, a valve body in the valve chamber and means for centering in and holding it out of contact with the cylindrical wall of the chamber, the end of the body forming a valve face adapted to seat on the valve seat, a metering cylinder carried by the valve body adapted to penetrate the metering chamber and having longitudinal metering slots cut into the surface of the metering cylinder adapted to be masked by the wall of the metering chamber at different positions of the valve, the housing being apertured at one side of the valve chamber, a lever pivoted on the housing adapted to mask the aperture, a valve actuating finger carried by the lever penetrating the aperture and engaging the valve block, the housing being recessed, the lever being skirted to penetrate the recess, a spring within the recess between the housing and the lever biasing the valve to closed position.

References Cited in the file of this patent

UNITED STATES PATENTS

| | | |
|---|---|---|
| 70,919 | Tucker | Nov. 12, 1867 |
| 258,540 | Whiting | May 23, 1882 |
| 1,289,714 | Elkin | Dec. 31, 1918 |
| 1,701,716 | Brown | Feb. 12, 1929 |
| 2,001,487 | Doherty | May 14, 1935 |
| 2,126,393 | Jandus | Aug. 9, 1938 |
| 2,303,130 | Moon | Nov. 24, 1942 |
| 2,468,673 | Kaminky | Apr. 26, 1949 |
| 2,678,847 | Caird | May 18, 1954 |
| 2,725,264 | Bodine | Nov. 29, 1955 |
| 2,754,160 | Owen | July 10, 1956 |
| 2,757,688 | Klingler | Aug. 7, 1956 |

FOREIGN PATENTS

| | | |
|---|---|---|
| 79,229 | Norway | Oct. 22, 1951 |
| 673,708 | Great Britain | June 11, 1952 |
| 1,075,011 | France | Apr. 7, 1954 |